UNITED STATES PATENT OFFICE.

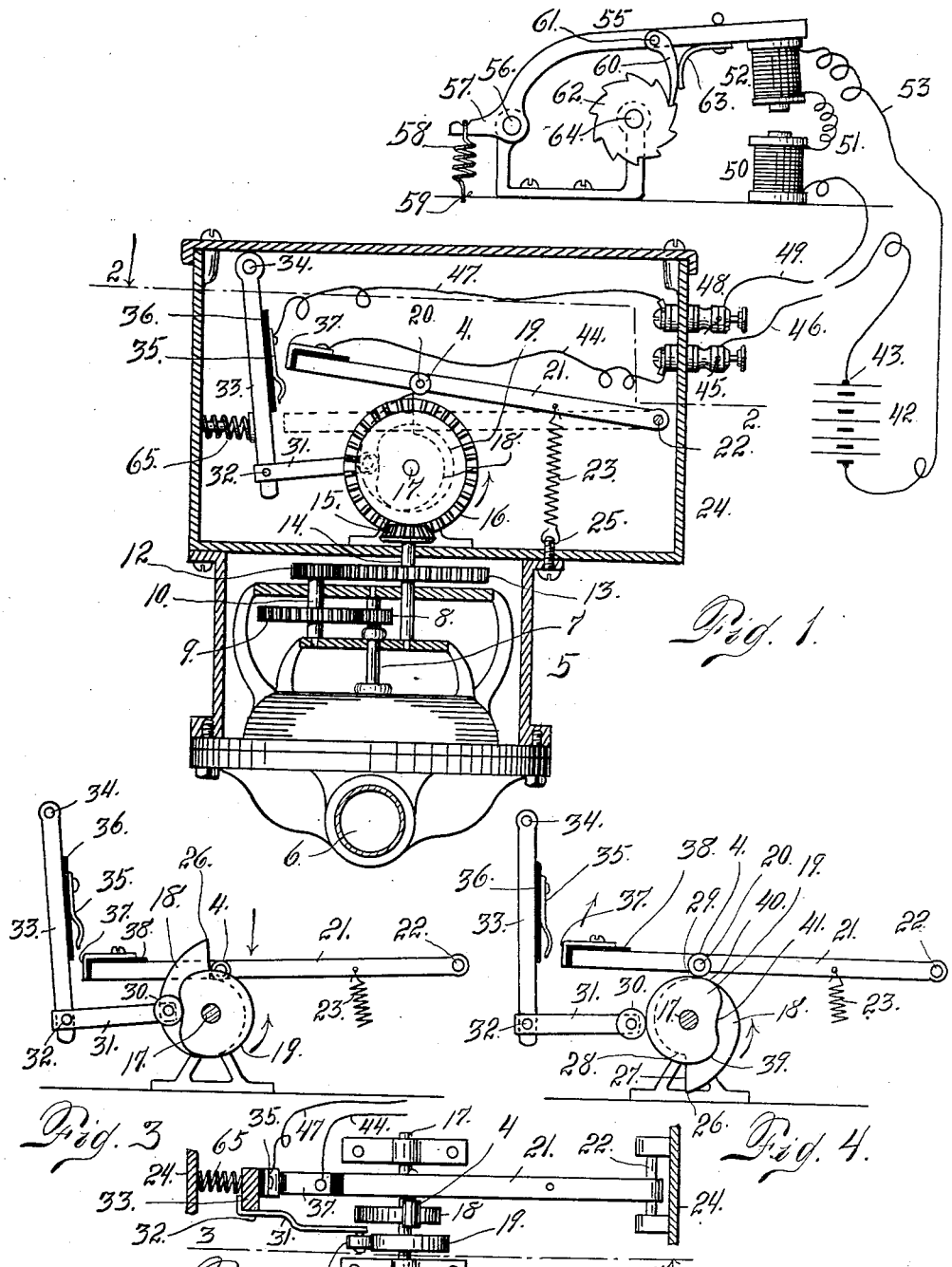
P. J. DEVAULT.
MAKE AND BREAK DEVICE.
APPLICATION FILED DEC. 3, 1912.
1,086,999.
Patented Feb. 10, 1914.

PHILIP J. DEVAULT, OF DENVER, COLORADO.

MAKE-AND-BREAK DEVICE.

1,086,999.   Specification of Letters Patent.   Patented Feb. 10, 1914.

Application filed December 3, 1912. Serial No. 734,720.

*To all whom it may concern:*

Be it known that I, PHILIP J. DEVAULT, a citizen of the United States, residing in the city and county of Denver and State of Colorado, have invented certain new and useful Improvements in Make-and-Break Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in devices for making and breaking an electric circuit, and, while the invention is of general application, it is particularly advantageous in connection with the operation of registers employed in connection with meters, or devices for measuring the flow and consumption of various fluids, as water, gases, etc.

In the accompanying drawing the use of the invention is illustrated in connection with a register and water meter, though, as above indicated, it must be understood that its use is not limited thereto, since it is evident that it may be employed in all similar relations. In fact, the invention is advantageous wherever it is desirable to make and break an electrical circuit, where it is required that the break shall be instantaneous, or immediately follow the making or closing of the circuit.

In my improved construction there is no opportunity for the contacts employed in making the circuit, to remain in engagement any appreciable length of time.

It is an important feature of my invention, especially when applied to the fluid meters where the moving parts stop from time to time as the consumption of the fluid ceases, that there is never any possibility for the electric circuit to remain closed longer than a single instant at each contact. Were it not so, and were there possibility of the contact at any time remaining closed by the stopping of the moving parts of the meter, the battery, or source of supply of electricity, would soon become exhausted, which would destroy the practicability of the invention.

Having briefly outlined my improved construction, I will proceed to describe the same in detail, reference being made to the accompanying drawing, in which is illustrated an embodiment thereof.

In this drawing: Figure 1 illustrates the invention in connection with a water meter and a register. Fig. 2 is a top plan view illustrating the operating parts of the make-and-break device, being a section taken approximately on the line 2—2, Fig. 1. Fig. 3 is a detail view, being a section taken on the line 3—4, Fig. 2, showing the cam construction in one of its positions. Fig. 4 is a similar view showing the cam construction in another position, or after the shaft upon which it is mounted has made approximately a half revolution from the position shown in Fig. 3.

The same reference characters indicate the same parts in all the views.

Let the numeral 5 designate a water meter which is operated by the flow of water through a conduit 6, which results in the rotary movement of the shaft 7 carrying a pinion 8 which meshes with a larger gear 9 fast upon a shaft 10, the said shaft also carrying a pinion 12 meshing with a larger gear 13 on a shaft 14. Upon the last named shaft is mounted a pinion 15 meshing with a relatively large gear 16 fast on a shaft 17. By virtue of this gearing mechanism it is evident that the speed of the shaft 17 is gradually reduced, so that the operation of the shaft 17 will be relatively slow. This last named shaft should make a complete revolution every time a predetermined quantity of water, as a gallon, passes through the conduit 6. Upon the shaft 17 are also mounted and made fast two cams 18 and 19. The face of the cam 18 is engaged by an antifrictional roller 4 mounted on a wrist pin 20 carried by an arm 21 which is pivoted on a spindle 22. Connected with the arm 21, between the spindle 22 and the anti-frictional roller 4, is a spiral spring 23, the latter being also connected with one wall of a casing 24 by means of a screw 25. This spring has a tendency to draw the arm 21 toward the shaft 17, whereby the roller 19 is constantly maintained in contact with the face of the cam. As the cam 18 revolves, the arm 21 is gradually thrown outward from the shaft, its maximum distance from the shaft being attained when the roller 4 has reached a point 26 on the cam. As soon as the roller passes beyond the point 26 it is drawn inwardly toward the shaft by the spring 23, at the upright offset 27; the arm is then again gradually moved outward from the shaft, as heretofore explained.

The cam 19 is concentric in character, except from points 39 to 40, and its face is engaged by an antifrictional roller 30 carried by an arm 31 rigidly secured at 32 to a third arm 33 pivotally mounted as shown at 34. The arm 33 carries a contact 35 which is insulated from the arm as shown at 36. The contact 35 coöperates with a contact 37 mounted on the arm 21, but insulated therefrom as shown at 38. The cam 19 is cut away on one side between two points 39 and 40, forming a face 41, which allows the roller 30 to approach the shaft 17 when the cam is properly adjusted. The two cams 18 and 19 are so arranged relatively on the shaft 17 that just as the roller 20 of the arm 21 leaves the point 26 of the cam 18, the roller 30 of the arm 31 will engage the center of the portion 41 of the face of the cam 19, or the point on the face of the last named cam where the roller approaches nearest to the shaft 17. As a result of this construction and arrangement, the contact 35 is drawn into the path of the contact 37 as the last named contact moves inwardly toward the shaft 17, and as these two contacts engage, an electrical circuit is completed through a battery or other suitable source of electricity 42. The contact 37 is connected with a pole 43 of the battery through the medium of a conductor 44, a binding post 45 and a conductor 46. A conductor 47 leads from the contact 35 to a binding post 48; while a conductor 49 leads from the last named binding post to one terminal of the coils of a magnet 50, while from the opposite terminal a conductor 51 leads to one terminal of the coils of a magnet 52, while from the opposite terminal thereof, a conductor 53 leads to the opposite pole 54 of the battery 42. By virtue of this arrangement the two magnets 50 and 52 may be energized. The magnet 50 is stationary, while the magnet 52 is mounted on a lever 55 fulcrumed at 56 and having an arm 57 with which a spring 58 is connected, the opposite extremity of this spring being secured to a stationary support, as shown at 59. The arm 55 carries a pawl 60 which is pivotally connected therewith, as shown at 61. This pawl is held in engagement with a ratchet disk 62 by means of a leaf spring 63. By virtue of this construction and arrangement, whenever the two contacts 37 and 35 are in engagement, the two magnets 50 and 52 will be energized, with the result that the magnet 52 will approach the magnet 50 during the circuit-closing period, with result that the pawl 60 will act on the ratchet disk 62 to turn the latter and the spindle 64 upon which it is mounted, a distance corresponding to the length of a single tooth of the disk. The spindle 64 is connected with a register, (not shown). It will be understood that the arrangement of the coils of the two magnets must be such that their pole pieces, or cores, are of opposite polarity, so that the combined magnetism of the two members will act to operate the lever 55 for the purpose of actuating the register.

From the foregoing description, the use and operation of my improvement will be readily understood. Assuming that fluid is flowing through the conduit 6, and whereby the mechanism of the meter 5 is operated to rotate the spindle 17, every time this spindle makes a complete revolution starting from the position shown in Fig. 3, the arm 21 will be raised to the position shown in Fig. 1, and released, whereby it assumes the position shown in Fig. 3. During the movement of the arm 21 away from the shaft 17, the arm 33 is moved outwardly, or away from the contact extremity of the arm 21, thus moving the contact 35 out of the path of the contact 37 during the upward movement of the arm 21. However, as soon as the roller 4 of the arm 21 has reached the point 26 of the cam 18, and falls to the position shown in Fig. 3, the arm 33 will be moved inwardly toward the shaft 17 by the action of a spring 65, whereby the contact 35 is brought into the path of the contact 37 as the latter moves inwardly toward the shaft 17 by virtue of the recoil action of the spring 23. The two arms 21 and 33, together with their contacts 35 and 37, are so arranged that the movement of the arm 21 as it approaches the shaft 17 under the influence of the spring 23, is always sufficient to break the engagement of the two elements 35 and 37, thus making it impossible that the two contacts 35 and 37 shall remain in engagement when the arm 21 is at rest.

In using this device for the operation of the register, it will be understood that the movement of the shaft 17 is liable to be interrupted at any time, but the construction and arrangement of my improved circuit make-and-break device is such that it is impossible for the two contacts 35 and 37 to be in engagement when the shaft 17 stops. Furthermore, it will be understood that by the employment of a register operated by my improvement, it becomes practicable to locate the register at any distance from the meter, thus making it unnecessary that the person who reads the register should be obliged to go into the locality where the meter is located.

The advantage of my invention when applied to water meters, will be further understood when it is realized that water meters have to be placed where the water pipe from which water is to be measured is located; which is always under ground, at considerable depth, difficult of access, and often dangerous on account of gases from the ground accumulating in the meter pit, besides the long distance frequently to be traversed to reach the meter. All of which difficulties could be obviated by the use of my invention which would make it easily practicable to put an entire city under meter service, and have all the meter dials placed in one building, or chamber, arranged in such order that they could be read with but a small fractional portion of the time now required to read a large number of meters at each meter pit.

Having thus described my invention, what I claim is:

1. A circuit make and break device comprising two cams rotatably mounted and two coöperating arms carrying electrical contacts and respectively engaging the said cams, each of said arms being movable toward and away from the axis of its cam, means for positively moving the said arms each toward the axis of its cam, the cams being positioned and their faces being fashioned to bring the contacts into engagement while the first arm is moving toward the axis of its cam and to prevent engagement of the contacts when the same arm is moving in the opposite direction.

2. A circuit make and break device comprising two cams mounted to rotate in unison upon a common axis and two coöperating arms carrying electrical contacts and engaging the faces of the cams, the said arms being movable toward and away from the axis of the cams, means for positively moving said arms toward the axis, the cams being positioned and their faces being formed to bring the contacts into engagement while the first arm is moving toward the axis and to prevent engagement of the contacts when the said arm is moving in the opposite direction, the cams being further positioned and constructed to allow the said arm a sufficient stroke to break the circuit during the movement toward the axis after the engagement of the contacts.

3. A circuit make-and-break device comprising two cams rotatably mounted and two arms actuated by the cams, the said arms carrying electrical contacts and engaging the faces of the cams each of said arms being movable toward and away from the axis of its cam, one of these movements being imparted by the cams and the other movement by means independent of the cams, the cams being positioned and their faces being fashioned to bring the contacts into engagement while the first arm is moving toward the axis of its cam and to prevent engagement of the contacts when the same arm is moving in the opposite direction, the cams being further positioned and constructed to allow the first arm sufficient stroke to break the circuit during its movement toward the axis of its cam after engagement of the contacts.

4. A circuit make-and-break device comprising two cams rotatably mounted and two coöperating arms engaging the cams and carrying electrical contacts, each of said arms being movable toward and away from the axis of its cam, the movement in one direction being imparted by the cams, and means independent of the cams for imparting movement in the opposite direction, the cams being positioned and their faces fashioned to bring the contacts into engagement while the first arm is moving toward the axis of its cam and to prevent engagement of the contacts when the same arm is moving in the opposite direction, the cams being positioned and constructed to permit the first arm to move past the position in which the two contacts are in the circuit-closing position.

5. A circuit make-and-break device comprising two cams rotatably mounted upon a common axis and two coöperating arms engaged by the cams and carrying electrical contacts, the cam which the first arm engages having an abrupt offset and the cam which the second arm engages having a point in its face nearest the axis, and the cams being so arranged that the cam-bearing of the first arm reaches the said offset at the same time that the bearing of the second arm reaches the point nearest the said axis.

6. In a device of the class described, a lever pivoted at one end and bearing an electrical contact at its opposite end, an element bearing a spring contact, said element being movable to throw said spring contact into or out of the arc of movement of said first named contact, means for causing said lever to swing slowly in one direction and rapidly in the other, and means for maintaining said spring contact out of the path of movement of the first named contact during the slow movement of the lever and in the path of the first named contact, during the rapid movement of the lever.

In testimony whereof I affix my signature in presence of two witnesses.

PHILIP J. DEVAULT.

Witnesses:
 MAY CLEMENTS,
 NORA SULLIVAN.